R. Savage.
Clutch for Elevator.
N° 88,217. Patented Mar. 23, 1869.
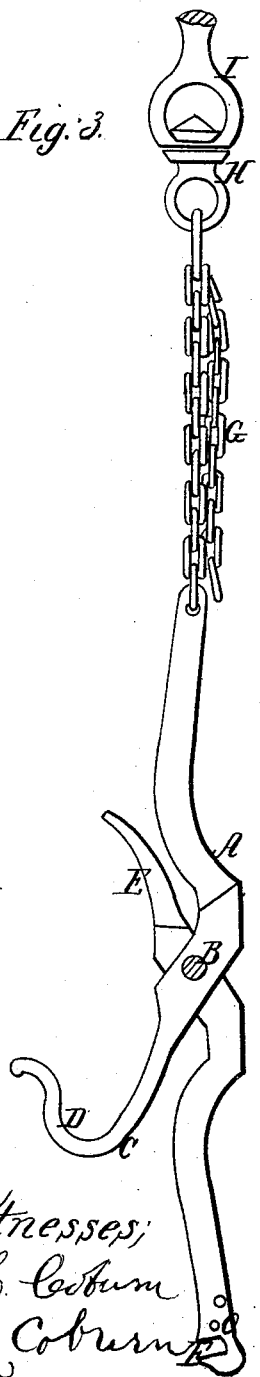
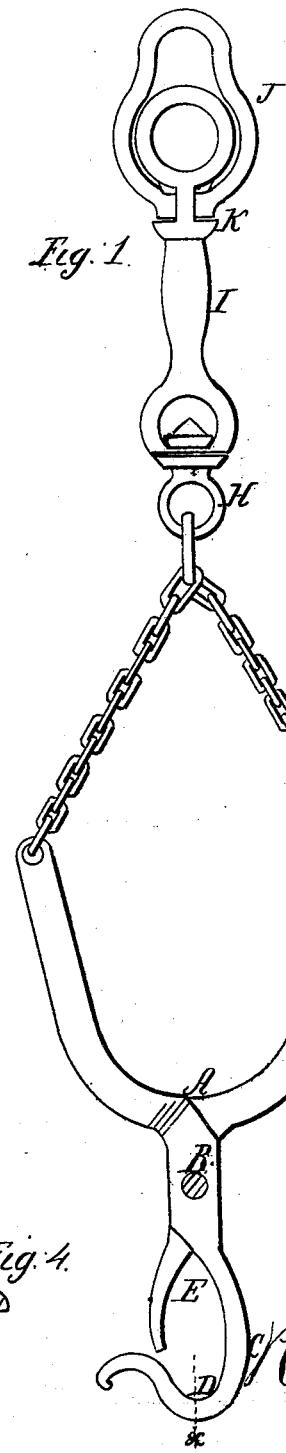
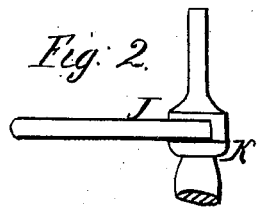
Fig. 3. Fig. 1. Fig. 2. Fig. 4.
Witnesses: Inventor,
L. L. Coburn Richard Savage
J. L. Coburn

UNITED STATES PATENT OFFICE.

RICHARD SAVAGE, OF CHICAGO, ILLINOIS.

Letters Patent No. 88,217, dated March 23, 1869.

IMPROVEMENT IN CLUTCH FOR SLAUGHTERING-PURPOSES.

The Schedule referred to in these Letters Patent and making part of the same.

*To all whom it may concern:*

Be it known that I, RICHARD SAVAGE, of Chicago, in the county of Cook, and State of Illinois, have invented a new and useful "Improved Clutch for Slaughtering-Purposes;" and I do hereby declare that the following is a full, clear, and exact description of the same, reference being had to the accompanying drawings, and the letters and figures marked thereon, which form a part of this specification, and in which—

Figure 1 represents a side elevation of my improved device;

Figure 2, a detached view of the top of said device, showing the position of the parts thereof when the animal is being raised;

Figure 3 represents the position the clutch assumes when the animal is dropped; and Figure 4, a sectional view of one of the jaws of the clutch, taken at the line *x*.

I am aware that clutches have been used for catching and hoisting hogs and other animals; but the jaws of said clutches were nearly or quite of equal length, so that the weight of the animal would be upon the ends thereof, and act as a wedge, to pry the jaws apart.

My invention consists in extending one of the jaws of the clutch around past the centre, as hereinafter more fully described, so that the weight will rest upon said jaw, and not act as a wedge between the ends of the jaws, to open them.

It further consists in constructing the end of one of the handles of said clutch with an open slot, so that the link, or ring of the chain can be thrown out of it, when the animal is suspended, and cause the clutch to open, and drop the animal where desired. Heretofore, the chains, or links have been permanently attached to the handles of the clutch; and My invention further consists in the peculiar construction of the hoisting-block, and the ring, or link attached thereto, whereby said link falls down to a right angle with said block, when the animal is being raised, and is held in a suitable position to be readily caught upon a hook, for suspension.

To enable those skilled in the art to understand how to manufacture and use my invention, I will proceed to describe the same with particularity.

The same letters of reference refer to the corresponding parts in the different figures.

A represents a clutch, which is made in two parts, and pivoted together, at B, in the usual manner of constructing clutches for slaughtering-purposes. I prefer, however, to make the clutch of cast-steel, for the purpose of lightness, so that it can be more readily handled.

One of the jaws C of the clutch is made in the shape of a hook, as clearly shown in figs. 1 and 3, so that it hooks around the hog's leg, and the weight of the animal rests upon it at D, when it is suspended.

The jaw E is made sufficiently long to fill the space necessary for the animal's leg to pass into the hooked jaw C.

This construction makes it much easier to hold the animal in the clutch.

In the end of one of the handles of the clutch, I make a slot, F, into which the chain G can be hooked, as shown in fig. 1.

I also attach the chains G to a swivel, H, in the lower end of the hoisting-block I.

Near the top of said block, there is a hole, or slot, through which the ring, or link J passes, just above a shoulder, K, on said block, the construction being such that said ring, or link will fall down upon said shoulder, in the position shown in fig. 2, when the animal is being raised.

The animal is raised by attaching the hoisting-apparatus to the ring L, at the top of the block I, and the link J, resting in the position shown in fig. 2, can be readily guided, so as to catch upon a hook, where it may be desired to suspend the animal.

The said link J then swings up into the position shown in fig. 1, and holds the weight.

When it is desired to drop the animal from the clutch A, the chain G is thrown from the slot F, when the clutch opens, as shown in fig. 3, and the animal falls.

The chain G may be thrown from the slot F by means of a pronged lever, L, which rests upon the pin, or shoulder O, as a fulcrum; or a cam-lever might be attached to the handle of the clutch, in such a way as to be operated to throw the link from the slot.

In operating the machine, a man takes the clutch by its handles, and hooks the jaw C around the animal's leg, the shape of said jaw enabling him to hold the animal with ease, till he can hook the chain G into the slot F, when the animal is instantly raised and suspended, as above described.

The inside of the jaw C, I make oval, at D.

Having fully described the construction and operation of my invention,

What I claim, and desire to secure by Letters Patent, is—

1. The hook-shape jaw C, of the clutch A, in combination with the jaw E, when constructed and arranged substantially as and for the purposes specified.

2. Constructing one of the handles of the clutch A with the slot F, substantially as and for the purposes specified.

3. The link J, in combination with the shoulder K, when constructed and operating substantially as described.

RICHARD SAVAGE.

Witnesses:
L. L. COBURN,
J. L. COBURN.